United States Patent [19]

Kobayashi et al.

[11] Patent Number: 4,873,583
[45] Date of Patent: Oct. 10, 1989

[54] MAGNETIC TAPE RECORDING/REPRODUCING APPARATUS

[75] Inventors: Masaaki Kobayashi, Kawanishi; Kazuhiro Yamanishi, Kashiwara; Akihiro Takeuchi, Ikoma; Yoshitomi Nagaoka, Neyagawa, all of Japan

[73] Assignee: Matsushita Electric Industrial Co., Ltd., Osaka, Japan

[21] Appl. No.: 943,200

[22] Filed: Dec. 18, 1986

[30] Foreign Application Priority Data

Dec. 18, 1985 [JP] Japan .................................. 60-284885

[51] Int. Cl.$^4$ .......................... H04N 9/79; H04N 5/76
[52] U.S. Cl. .................................... 358/310; 358/335; 360/18; 360/33.1; 360/61
[58] Field of Search ................ 358/310, 330, 334, 335, 358/323, 320; 360/10.3, 18, 22, 24, 33.1, 61

[56] References Cited

U.S. PATENT DOCUMENTS

| | | | |
|---|---|---|---|
| 3,809,804 | 5/1974 | Okuno et al. ......................... | 358/333 |
| 4,390,906 | 1/1983 | Furumoto et al. ................... | 360/33.1 |
| 4,550,345 | 10/1985 | Terada et al. ......................... | 358/323 |
| 4,575,722 | 3/1986 | Shimada et al. ................. | 358/335 X |
| 4,719,518 | 1/1988 | Kido et al. ........................... | 358/330 |
| 4,743,977 | 5/1988 | Yoshioka et al. .................... | 358/310 |

FOREIGN PATENT DOCUMENTS

| | | |
|---|---|---|
| 0194790 | 9/1986 | European Pat. Off. . |
| 2246509 | 5/1973 | Fed. Rep. of Germany . |
| 3310999 | 9/1983 | Fed. Rep. of Germany . |

OTHER PUBLICATIONS

"Triple Imaging System", Mitsubishi Electric Corporation.
"Triple System Color TV, Video Cassette Recorder, and Projection TV", by Itoga et al, Mitsubishi Electric Advance, vol. II, pp. 25 and 26, Mar. 1980.
HOSO GIJUTSU (Broadcasting Technology), vol. 35, No. 10, Oct. 1982, pp. 64–81.

Primary Examiner—W. B. Perkey
Attorney, Agent, or Firm—Wenderoth, Lind & Ponack

[57] ABSTRACT

A magnetic tape recording/reproducing apparatus comprises a recording signal processing section, a head section, and a reproduced signal processing section. The recording signal processing section comprises a plurality of recording signal processing circuits each for converting a video signal to one or more recordable signals, and a first switch circuit for selectively connecting one of the recording signal processing circuits to the head section. The head section has a plurality of magnetic heads mounted on a single rotary cylinder for recording the recordable signals on a magnetic tape and reproducing the recorded signals from the magnetic tape. The reproduced signal processing section comprises a plurality of reproduced signal processing circuits each for converting the reproduced signals to the original video signal, a second switch circuit for selectively connecting one of the reproduced signal processing circuits to the head section, and a recognition circuit for recognizing what kind of signals are reproduced from the head section and producing a control signal for controlling the second switch circuit.

6 Claims, 6 Drawing Sheets

MAGNETIC TAPE RECORDING/REPRODUCING APPARATUS

BACKGROUND OF THE INVENTION

1. Field of the Invention

This invention relates to a magnetic tape recording/reproducing apparatus for recording video signals on a magnetic tape and reproducing the recorded video signals.

2. Description of the Prior Art

There have been two types of video tape recorders (VTRs) the color under recording VTR and the 2-channel component signal recording VTR. The former converts the frequency band of chrominance signal to a low frequency band before recording a video signal. The VHS format VTRs and the BETA format VTRs, which are for home use, are included in the former type.

The latter separates a video signal into 2-channel component signals—luminance signal and chrominance signal—, and records the 2-channel component signals separately from each other. The RECAM (M format) VTRs and the BETACAM (L format) VTRs, which are for industrial or broadcasting use, are included in the latter type. [HOSO GIJUTSU (Broadcasting Technology), VOL. 35 No. 10, October 1982, pp. 64–81].

The conventional two types of VTRs are not compatible to each other. In other words, the video signal recorded on a magnetic tape by a color under recording VTR cannot be reproduced by a 2-channel component signal recording VTR, and vice versa. For, the two types of VTRs are different from each other in signal processing method, arrangement of magnetic heads, etc., although they use the same size of rotary cylinder and the same tape cassette.

SUMMERY OF THE INVENTION

Therefore, a primary object of the present invention is to provide a magnetic tape recording/reproducing apparatus which is capable of recording/reproducing any one of the color under video signal and the two channel component signals Another object of the present invention is to provide an arrangement of rotary magnetic heads which can be commonly used for recording/reproducing the color under video signal and the two-channel component signals.

A magnetic tape recording/reproducing apparatus according to the present invention comprises a recording signal processing section for converting an input video signal to a recordable signal, a head section for recording the recordable signal on a magnetic tape and reproducing the recorded signal from the magnetic tape, and a reproduced signal processing section for converting the reproduced signal from the head section to the original video signal. The recording signal processing section comprises at least a first recording signal processing circuit for converting a video signal to a recordable 1-channel video signal, a second recording signal processing circuit for converting a video signal to a recordable 2-channel component signals, and a first switch circuit for selectively passing the recordable 1-channel video signal or the recordable 2-channel component signals to the head section. The reproduced signal processing section comprises at least a first reproduced signal processing circuit for converting a reproduced 1-channel video signal to the original video signal, a second reproduced signal processing circuit for converting reproduced 2-channel component signals to the original video signal, a second switch circuit for selectively passing the reproduced 1-channel video signal from the head section to the first reproduced signal processing circuit or the reproduced 2-channel component signals from the head section to the second reproduced signal processing circuit, and a recognition circuit for recognizing which of the 1-channel signal and the 2-channel component signals is/are reproduced from the head section and controlling the second switch circuit.

The head section comprises two pairs of magnetic heads mounted on a rotary cylinder. The first pair of magnetic heads of the two pairs have different azimuth angles from each other. Each of the second pair of magnetic heads has an azimuth angle which is different from that of each of the first pair of magnetic heads. Each pair of magnetic heads are apart by 180° from each other in the rotating direction thereof, and each head of one pair is disposed closely to one of the other pair. The 1-channel video signal is recorded and reproduced by one pair of the two pairs of magnetic heads. The 2-channel component signals are recorded and reproduced by the two pairs of magnetic heads.

The recording signal processing section may have three or more number of recording signal processing circuits, and the reproduced signal processing section may also have three or more number of reproduced signal processing circuits.

The above and other objects and features of the present invention will be apparent from the following description taken in connection with the accompanying drawings in which:

DESCRIPTION OF THE PREFERRED EMBODIMENTS

Figure 1:
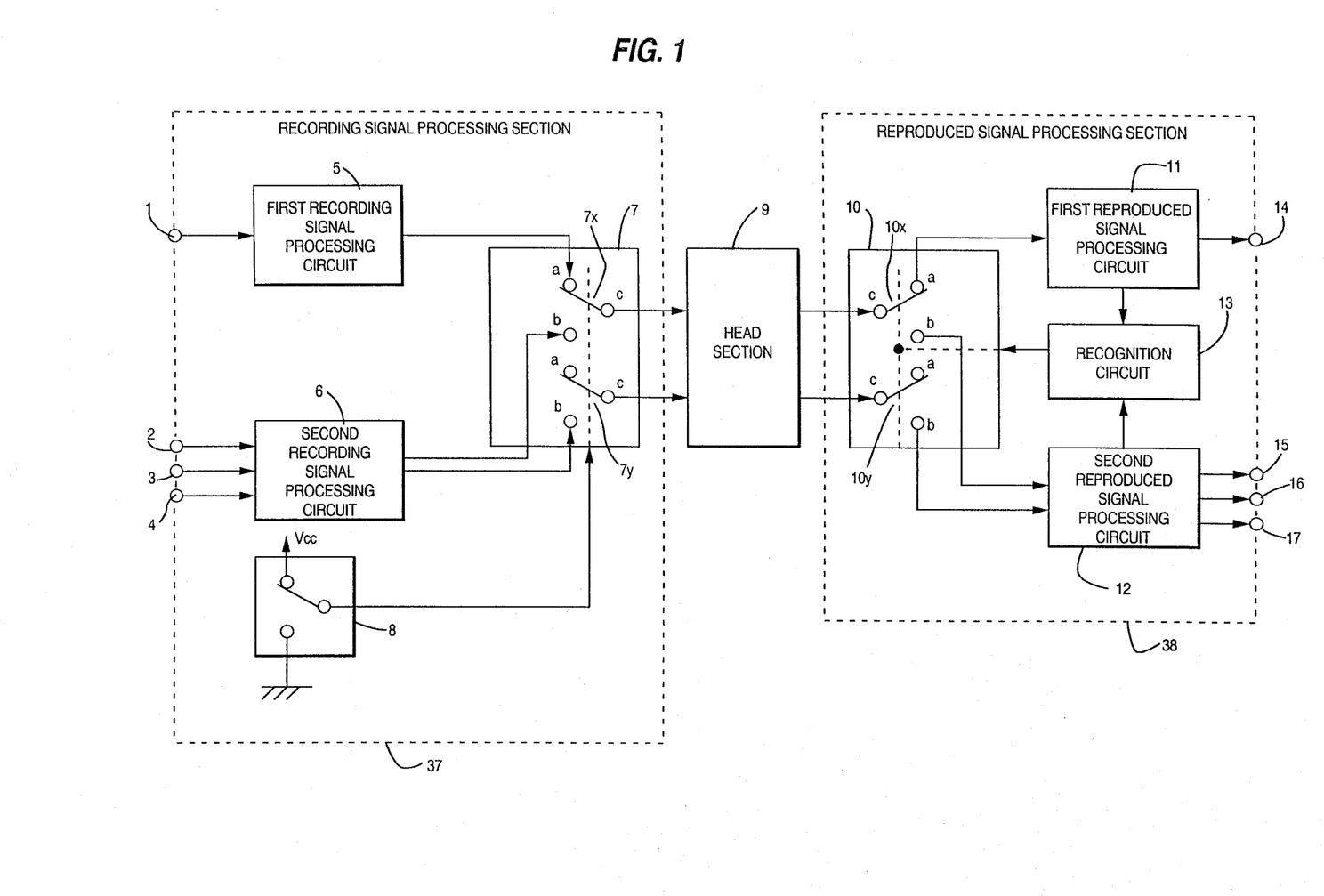
FIG. 1 is a schematic block diagram showing an embodiment of the present invention.

FIG. 1 shows a block diagram showing a magnetic tape recording/reproducing apparatus as an embodiment of the present invention, which is composed a recording signal processing section 37, a head section 9, and a reproduced signal processing section 38.

An input terminal 1 is for feeding a composite video signal (NTSC signal, for example), and input terminals 2, 3 and 4 are for feeding three kinds of component signals (R, G, B signals, for example), respectively. The composite video signal fed to the input terminal 1 is converted by a first recording signal processing circuit 5 to a color under recording video signal in which the frequency band of chrominance signal is converted to a low frequency band. The first recording signal processing circuit 5 is such a known circuit as used in the conventional VHS format VTRs or BETA format VTRs. The color under recording signal is supplied to a switch circuit 7.

The three component signals fed to the input terminals 2–4 are converted by a second recording signal processing circuit 6 to 2-channel component signals of BETACAM format, M format or ML! format. The second recording signal processing circuit is such a known circuit as used in the conventional BETACAM format VTRs, M format VTRs or MII ir NII format VTRs. The 2-channel component signals are supplied to the switch circuit 7.

The switch circuit 7 is composed of two changeover switches 7x and 7y which are controlled by an output signal from a manual switch 8. When the manual switch 8 is turned to a Vcc-side terminal thereof each of the changeover switches 7x and 7y selects a terminal a thereof, and when the manual switch 8 is turned to a ground-side terminal thereof, each of the changeover switches 7x and 7y selects the other terminal b thereof. The color under recording signal from the first recording signal processing circuit 5 is applied to the terminal a of the changeover switch 7x. The 2-channel component signals from the second recording signal processing circuit 6 are applied to the terminals b of the changeover switches 7x and 7y, respectively. Common terminals c of the changeover switches 7x and 7y are connected to the head section 9. Therefore, the color under recording signal can be fed to the head section 9 by turning the manual switch 8 to the Vcc-side terminal, and the 2-channel component signals can be fed to the head section 9 by turning the manual switch 8 to the ground-side terminal.

Figure 2:
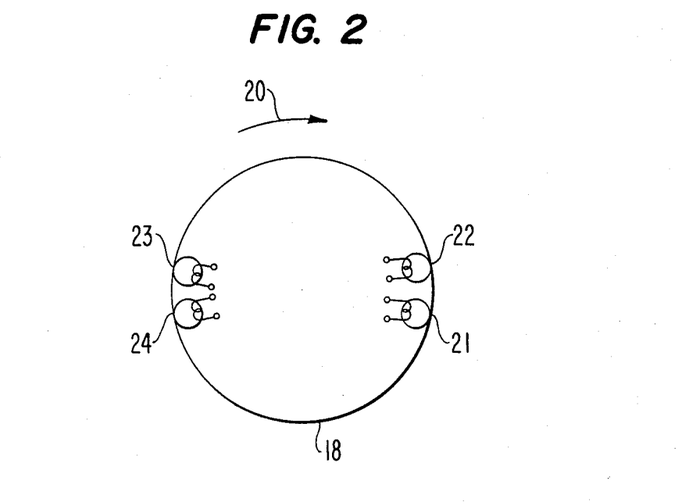
FIG. 2 is a schematic top view showing a head section in the embodiment of FIG. 1.
Figure 3:
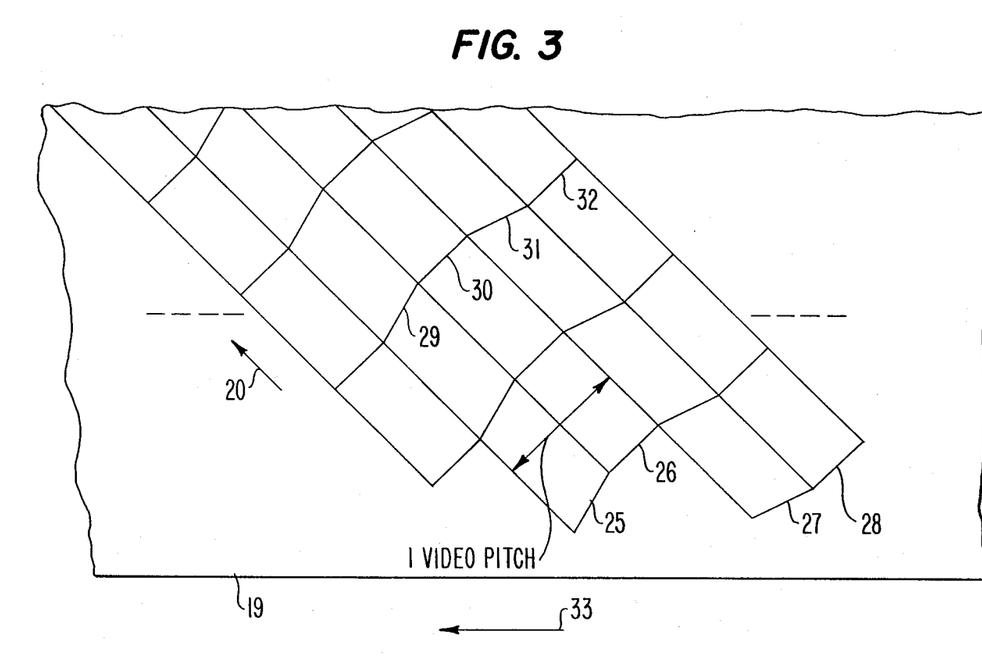
FIGS. 3–5 are video track pattern diagrams obtained by the embodiment of FIG. 1.

The head section 9 has two pairs of magnetic heads 21, 23 and 22, 24 which are mounted on a rotary cylinder 18 rotating in a direction 20 as shown in FIG. 2. One pair of magnetic heads 21 and 23 are apart by 180° from each other in the rotating direction thereof, and rotate on a same plane. The other pair of magnetic heads 22 and 23 are apart by 180° from each other in the rotating direction thereof, and rotate on a same plane. The other pair of magnetic heads 22 and 23 are apart by 180° from each other in the rotating direction thereof, and rotate on another same plane which is shifted upward or downward by ½ video pitch (video pitch is shown in FIG. 3) from the rotating plane of the pair of magnetic heads 21 and 23. A distance between the heads 21 and 22 or the heads 23 and 24 in the rotating direction is selected within a range between several hundred micrometers and several millimeters.

Figure 4:
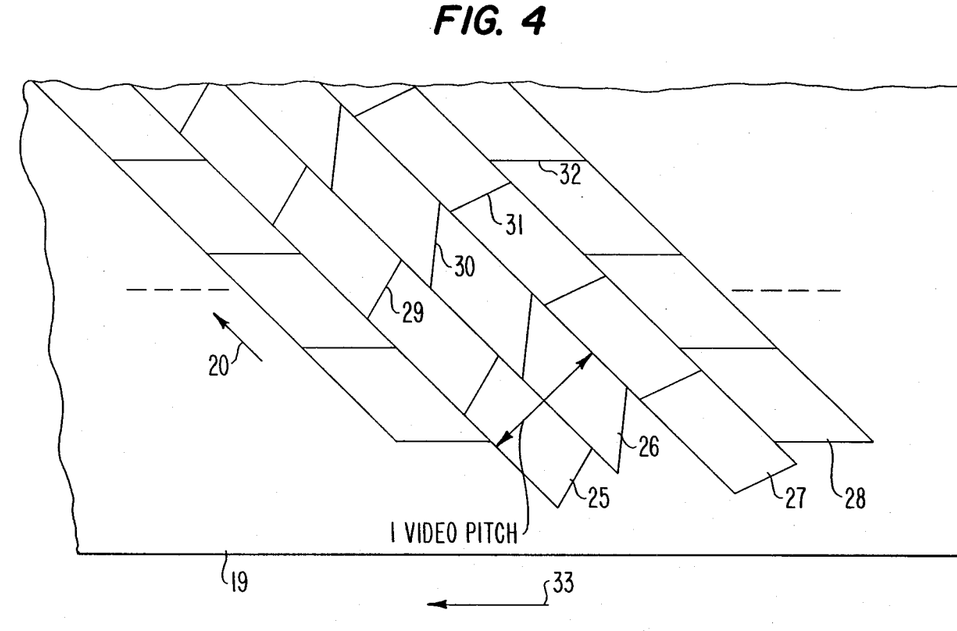

The pair of magnetic heads 21 and 23 have different azimuth angles from each other. Each of the other pair of magnetic heads 22 and 24 has an azimuth angle which is different from that of each of the pair of magnetic heads 21 and 23. For example, the azimuth angles of the pair of magnetic heads 21 and 23 are selected +6° and −6°, respectively. If the azimuth angles of the other pair of magnetic heads 22 and 24 are both selected 0°, the video track pattern on a magnetic tape 19 becomes as shown in FIG. 3. If the azimuth angles of the other pair of magnetic heads 22 and 24 are selected +18° and −18°, respectively, the video track pattern becomes as shown in FIG. 4. If the azimuth angles of the other pair of magnetic heads 22 and 24 are selected −18° and +18°, respectively, the video track pattern becomes as shown in FIG. 5.

Figure 5:
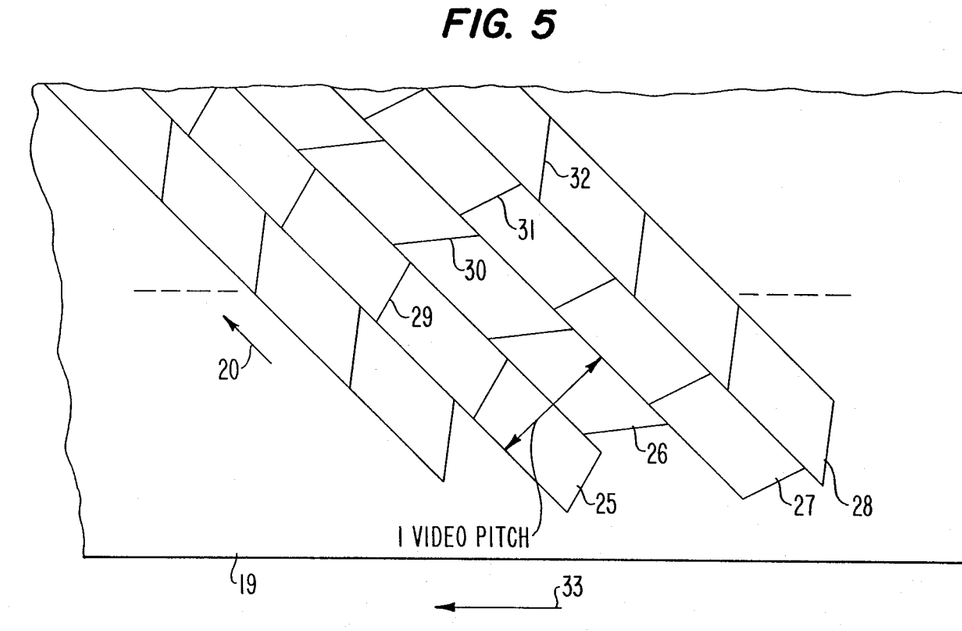

Referring to each video track pattern diagram shown in FIG. 3, 4 or 5, the magnetic tape 19 travels in a direction shown by an arrow 33. An arrow 20 shows the head moving (scanning) direction. The magnetic heads 21, 22, 23 and 24 shown in FIG. 2 scan video tracks 25, 26, 27 and 28, respectively, for both recording and reproducing. Tilt lines 29, 30, 31 and 32 on the video tracks show portions on which horizontal synchronizing signals are recorded in the 2-channel component signal recording mode. The tilt angle of each of the tilt lines from the width direction of each video track represents the head azimuth angle.

The color under recording signal from the first recording signal processing circuit 5 is recorded on and reproduced from a magnetic head via the pair of magnetic heads 21 and 23. On the other hand, the 2-channel component signals from the second recording signal processing circuit 6 are recorded on and reproduced from a magnetic tape via both of the two pairs of magnetic heads 21, 23 and 22, 24.

It is preferable that the horizontal synchronizing signal recorded portions are aligned in a video track pattern as shown in FIG. 3 (H alignment). The head width of each magnetic head may be either wider or narrower than ½ of the video pitch. The wider head width is advantageous in that each video track is partly overwritten by an adjacent video track in the 2-channel component signal recording mode.

Referring again to FIG. 1, the reproduced signal processing section 38 is composed of a first reproduced signal processing circuit 11 connectable to the head section 9 via a switch circuit 10, a second reproduced signal processing circuit 12 connectable to the head section 9 via the switch circuit 10, and a recognition circuit 13 which recognizes which of the color under recording signal and the 2-channel component signals is/are reproduced and produces a control signal for controlling the switch circuit 10.

The first reproduced signal processing circuit 11 converts the reproduced color under recording signal from the head section 9 to the original composite video signal, which is outputted from an output terminal 14. The first reproduced signal processing circuit 11 is such a known circuit as used in the conventional VHS format VTRs or BETA format VTRs.

The second reproduced signal processing circuit 12 converts the reproduced 2-channel component signals from the head section 9 to the original three component signals, which are outputted from output terminals 15, 16 and 17, respectively. The second reproduced signal processing circuit 12 is such a known circuit as used in the conventional BETACAM format VTRs, M format VTRs or ML format VTRs.

The switch circuit 10 is composed of two changeover switches 10x and 10y which are controlled by the control signal from the recognition circuit 13. More specifically, the recognition circuit 13 controls each of the changeover switches 10x and 10y to select a terminal a thereof when the color under recording signal is reproduced from the head section 9, and to select a terminal b thereof when the 2-channel component signals are reproduced from the head section 9. The terminal a of the changeover switch 10x is connected to the first reproduced signal processing circuit 11, and the terminals b of the changeover switches 10x and 10y are connected to the second reproduced signal processing circuit 12. Common terminals c of the changeover switches 10x and 10y are connected to the head section 9. Thus, the color under recording signal reproduced from the head section 9 is applied to the first reproduced signal processing circuit 11 via the switch circuit 10, and the 2-channel component signals reproduced from the head section 9 are applied to the second reproduced signal processing circuit 12 via the switch circuit 12.

The recognition circuit 13 recognizes either the color under recording signal or the 2-channel component signals from signals processed in the first and second reproduced signal processing circuits 11 and 12. For allowing the recognition circuit 13 distinguish the two kinds of reproduced signals, various method can be used by the person skilled in the art. For example, the modulation frequencies for the synchronizing signal are made different from each other in the first and second recording signal processing circuits 5 and 6. As an example, the modulation frequency in the first recording signal processing circuit 5 is selected 3.4 MHz, while that in the second recording signal processing circuit 6 is selected 4.4 Mhz. In this case, in either one of the first and second reproduced signal processing circuit 11 and 12, a reproduced signal from the head section 9 is frequency-demodulated. The synchronizing signal is separated from the demodulated signal by a level separation circuit and held by a hold circuit to be a DC voltage signal corresponding to the modulation frequency. This DC voltage is applied to the recognition circuit 13. The recognition circuit 13 comprises a comparator which compares the DC voltage with a reference voltage thereby to produce the control signal applied to the switch circuit 10.

The other methods for the signal recognition are to insert a burst signal into each horizontal blanking period only in one of the first and second recording signal processing circuits 5 and 6; or to insert a pilot signal into a frequency band which does not interfere the video signal; or to use different synchronizing signals (different in duration, level, or polarity) from each other in the two circuits 5 and 6; or to use the signals to be frequency-modulated having different polarities from each other in the two circuits 5 and 6.

The recognition circuit may be modified to produce the control signal directly from the signal reproduced from the head section 9. Such a modified embodiment is shown in FIG. 6.

Figure 6:
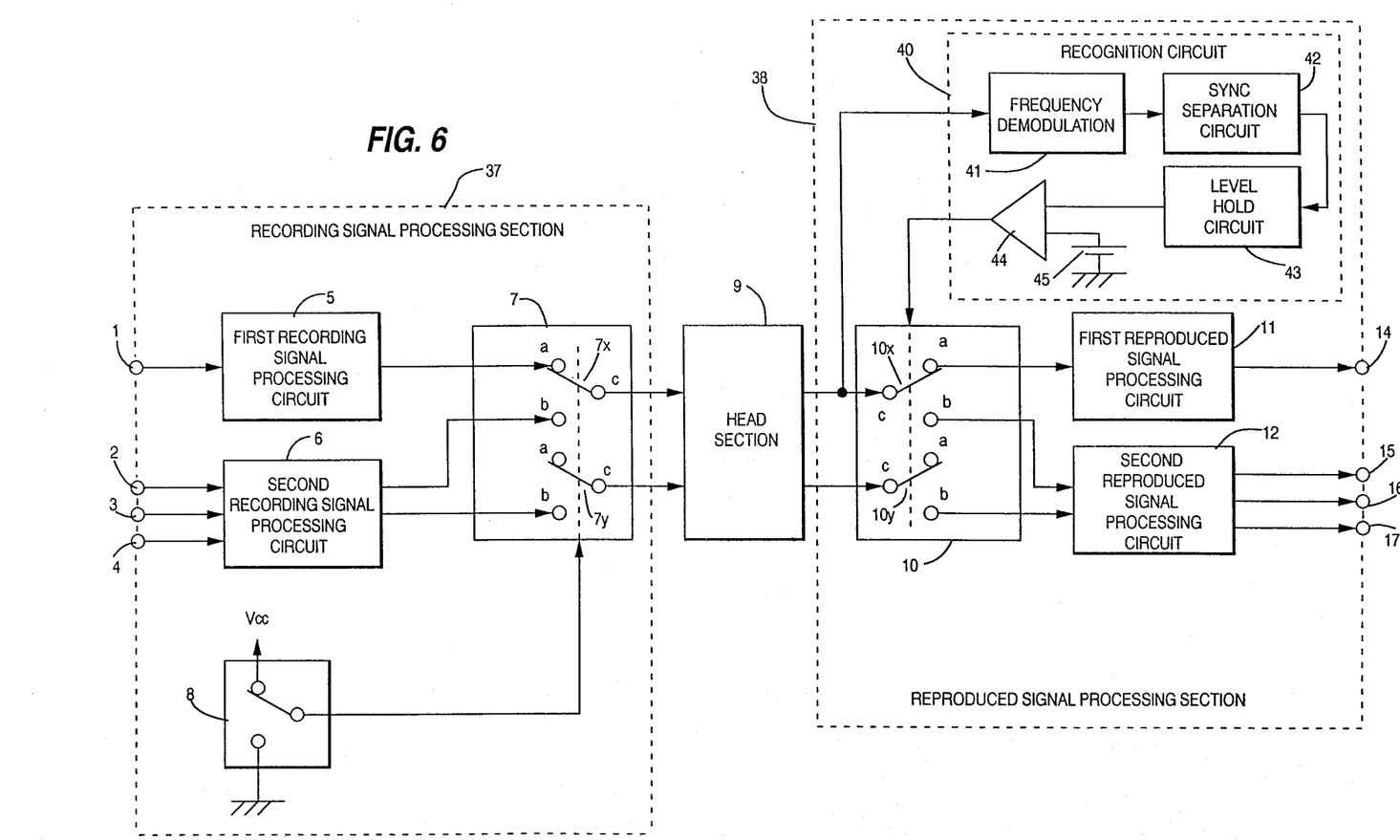
FIG. 6 is a schematic block diagram showing another embodiment of the present invention.

Referring to FIG. 6, a recognition circuit 40 is provided in place of the recognition circuit 13 of the FIG. 1 embodiment. The input of the recognition circuit 40 is connected to the line between the head section 9 and the common terminal c of the changeover switch 10x. The modulation frequency for the synchronizing signal in the first recording signal processing circuit 5 is made different from that in the second recording signal processing circuit 6 as described before.

The recognition circuit 40 is composed of a frequency demodulator 41, a sync separation circuit 42, a level hold circuit 43, a comparator 44, and a reference voltage source 45. The signal reproduced from the head section 9 is frequency-demodulated by the frequency demodulator 41. The synchronizing signal is separated from the frequency-demodulated signal by the sync separation circuit 42. The level hold circuit 43 holds the level of the separated synchronizing signal to obtain a DC voltage signal. The comparator 44 compares the DC voltage signal with a reference voltage generated by the reference voltage source 45. The output signal of the comparator 44 is applied as the control signal to the switch circuit 10.

In the above description, each of the recording and reproduced signal processing sections 37 and 38 has two different signal processing circuits. But, each of them may have three or more number of different signal processing circuits each performing a conversion between any video signal or signals and any recordable signal or signals.

In the above two embodiments, the recognition circuit 13 or 40 produces the control signal from the reproduced signal from the head section 9. But, the recognition can be made by providing a mark on the tape cassette and detecting the mark. An example of this type of recognition circuit is shown in FIG. 7.

Figure 7:
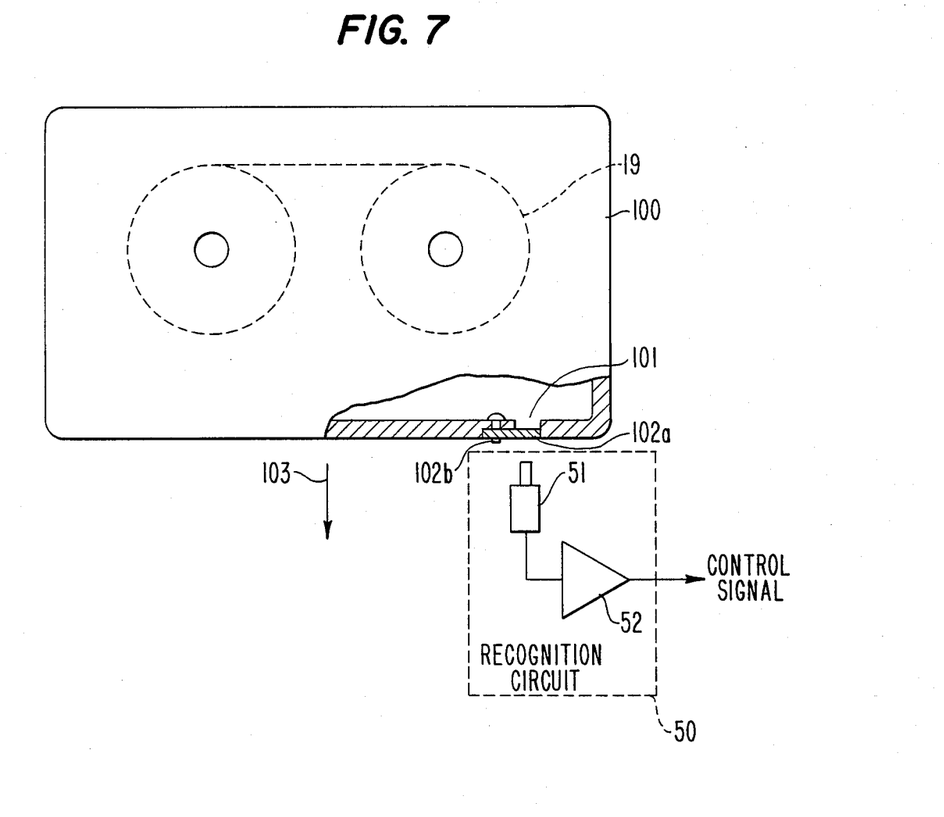
FIG. 7 is a schematic block diagram showing another example of recognition circuit with a partially sectional plan view of a tape cassette.

Referring to FIG. 7, a tape cassette 100 is provided at a rear surface thereof with a hole 101 and a pivotable shutter 102a pivotable about a pin 102a. When the color under recording signal is recorded on the magnetic tape 19 the shutter 102a is moved to a position to close the hole 101, and when the 2-channel component signals are recorded on the tape 19 the shutter 102a is moved to a position to open the hole 101. When the hole 101 is closed, if the cassette 100 is inserted into the apparatus in a direction 103 a contact switch 51 contacts the shutter 102a to be turned on. When the hole 101 is opened, the contact switch 51 will not be operated to maintain its off-state. The output signal of the contact switch 51 is amplified by an amplifier 52 to be the control signal for controlling the switch circuit 10 in FIG. 1 or 6. Thus, the contact switch 51 and the amplifier 52 constitute a recognition circuit 50 which can be used in place of the circuit 13 in FIG. 1 or the circuit 40 in FIG. 6.

The hole 101 may be replaced by a reflection tape stuck on a side surface of the tape cassette 100. In this case, the contact switch 51 may be replaced by a photodiode for emitting a light, and a photodetector for detecting the light reflected from the reflection tape. Of course, the shutter 102a is not always necessary, but the hole or the reflection tape may be provided at need after recording signals.

Any other markings on the cassette tape and any other marking detection methods can be used within the scope of the present invention.

What is claimed is:

1. A magnetic tape recording/reproducing apparatus comprising:
   a recording signal processing section for converting a video signal to one or more recordable signals;
   a head section having a plurality of magnetic heads mounted on a signal rotary cylinder for recording said one or more recordable signals on a magnetic tape and for reproducing said one or more recordable signals which have been recorded from said magnetic tape; and
   a reproduced signal processing section for converting said one or more reproduced signals from said head section to said video signal,
   wherein said recording signal processing section comprises: a first recording signal processing circuit for converting a first kind of video signal to a 1-channel video signal; a second recording signal processing circuit for converting a second kind of video signal to 2-channel component signals; and a first switch circuit for selectively connecting one of said first and second recording signal processing circuits to said head section, and
   wherein said reproduced signal processing section comprises: a first reproduced signal processing circuit for converting said 1-channel video signal reproduced from said head section to said first kind of video signal; a second reproduced signal processing circuit for converting said 2-channel component signals reproduced from said head section to said second kind of video signal; a second switch circuit for selectively connecting one of said first and second reproduced signal processing circuits to said head section; and a recognition circuit for recognizing which of said 1-channel video signal and said 2-channel component signals are reproduced from said head section and producing a control signal for controlling said second switch circuit.

2. The apparatus according to claim 1, wherein said plurality of magnetic heads comprise a first pair of magnetic heads which are apart by 180° from each other in a rotating direction thereof and have different azimuth angles from each other, and a second pair of magnetic heads which are apart by 180° from each other in a rotating direction thereof, each of said second pair of magnetic heads being disposed closely to one of said first pair of magnetic heads and having an azimuth angle which is different from that of each of said first pair of magnetic heads, wherein said 1-channel video signal is recorded and reproduced by said first pair of magnetic heads and said 2-channel component signals are recorded and reproduced by both of said first and second pairs of magnetic heads.

3. The apparatus according to claim 2, wherein said first pair of magnetic heads rotate on a same plane, and said second pair of magnetic heads rotate on another same plane at a predetermined distance from said rotating plane of said first pair.

4. The apparatus according to claim 1, wherein said recording signal processing section further comprises a manually operated switch for producing a signal for controlling said first switch circuit.

5. The apparatus to claim 1, wherein said first kind of video signal is a composite video signal and said 1-channel video signal is a color under recording signal.

6. The apparatus according to claim 5, wherein said second kind of video signal is composed of three component signals of a video signal.

* * * * *